United States Patent Office 3,145,210
Patented Aug. 18, 1964

3,145,210
ESTERS OF 2-TROPANOL
Sydney Archer, Bethlehem, and Malcolm R. Bell, East Greenbush, N.Y., assignors to Sterling Drug Inc., New York, N.Y., a corporation of Delaware
No Drawing. Filed Dec. 4, 1961, Ser. No. 157,018
14 Claims. (Cl. 260—292)

This invention relates to carboxylic acid esters of heterocyclic alcohols, and in particular is concerned with poly-substituted acetic acid esters of 2-tropanol and homologs thereof, and with processes for their preparation.

One aspect of the invention is concerned with compounds having the formula

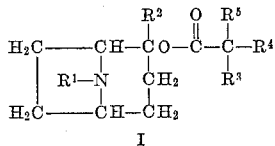

I wherein $R^1$ is hydrogen, lower-alkyl or lower-alkenyl; $R^2$ is hydrogen or lower-alkyl; $R^3$ is hydrogen, hydroxy, lower-alkoxy or lower-alkanoyloxy; and $R^4$ and $R^5$ are monocarbocyclic aryl, thienyl, pyridyl, cycloalkyl or cycloalkenyl. Also contemplated are compounds of the above formula wherein $R^4$ and $R^5$ in the moiety $CR^4R^5$ are joined to form a fluorenyl, xanthenyl, thiaxanthenyl or 9,10-dihydroanthracenyl ring as well as acid-addition and quaternary ammonium salts of the foregoing.

Another aspect of the invention is concerned with compounds having the formula

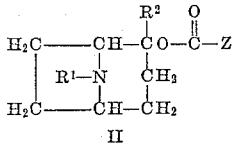

II wherein $R^1$ is hydrogen, lower-alkyl or lower-alkenyl; $R^2$ is hydrogen or lower-alkyl; and Z is 1-(monocarbocyclic aryl)cycloalkyl, including the acid-addition and quaternary ammonium salts thereof.

In the above Formulas I and II, $R^1$ stands for hydrogen or lower-alkyl. The lower-alkyl groups preferably groups preferably have from one to four carbon atoms and thus include such groups as methyl, ethyl, propyl, isopropyl, butyl, isobutyl, and the like. The lower-alkenyl groups preferably have from three to four carbon atoms and thus include such groups as allyl, methallyl, 2-butenyl and the like.

In the above Formulas I and II, $R^2$ stands for hydrogen or lower-alkyl. The lower-alkyl groups preferably have from one to four carbon atoms and thus include such groups as methyl, ethyl, propyl, isopropyl, butyl, isobutyl and the like.

In the above Formula I, $R^3$ stands for hydrogen, hydroxy, lower-alkoxy or lower-alkanoyloxy. The lower-alkoxy groups preferably have from one to four carbon atoms and thus include such groups as methoxy, ethoxy, propoxy, isopropoxy, butoxy, isobutoxy, and the like. The lower-alkanoyl groups preferably have from one to six carbon atoms and thus include such groups as formyloxy, acetoxy, propionoxy, butyryloxy, isobutyryloxy, valeryloxy, caproyloxy, and the like.

In the above Formula I, $R^4$ and $R^5$ stand for monocarbocyclic aryl, thienyl, pyridyl, cycloalkyl or cycloalkenyl. $R^4$ and $R^5$ can be the same or different. The monocarbocyclic aryl groups are monocyclic aromatic groups of the benzene series and thus can be phenyl rings optionally substituted by conventional groups inert under the conditions of the processes used to prepare the compounds. A preferred class of monocarbocyclic aryl groups comprises phenyl and phenyl substituted by from one to three radicals selected from lower-alkyl, lower-alkoxy, halogen (including fluorine, chlorine, bromine and iodine), lower-alkylmercapto and trifluoromethyl. The lower-alkyl, lower-alkoxy and lower-alkylmercapto radicals contain from one to about four carbon atoms, thus including, inter alia, methyl, ethyl, propyl, isopropyl, butyl, methoxy, ethoxy, propoxy, isopropoxy, butoxy, methylmercapto, ethylmercapto and butylmercapto.

When $R^4$ and/or $R^5$ stand for thienyl or pyridyl, they can be in any of the various possible orientations, namely, 2-thienyl, 3-thienyl, 2-pyridyl, 3-pyridyl, 4-pyridyl and lower-alkylated derivatives thereof.

When $R^4$ and $R^5$ stand for cycloalkyl or cycloalkenyl, the cycloalkyl groups preferably have from 5 to 6 ring members and thus include cyclopentyl, cyclohexyl and lower-alkylated derivatives thereof; and the cycloalkenyl groups preferably have from 5 to 6 ring members and thus include 1-cyclopentenyl, 2-cyclopentenyl, 3-cyclopentenyl, 1-cyclohexenyl, 2-cyclohexenyl and 3-cyclohexenyl.

In the cases where $R^4$ and $R^5$ in compounds of Formula I are joined in the moiety $CR^4R^5$ to form a fluorenyl, xanthenyl, thiaxanthenyl or 9,10-dihydroanthracenyl ring, these merely represent variants of the compounds where $R^4$ and $R^5$ are both monocarbocyclic aryl wherein $R^4$ and $R^5$ are bridged by a bond (fluorenyl) or by an oxygen atom, a sulfur atom or a methylene group.

In the above Formula II, Z stands for a 1-(monocarbocyclic aryl)cycloalkyl group. The monocarbocyclic aryl groups are of the same type as defined above for the monocyclic aryl groups $R^4$ and $R^5$. The cycloalkyl portion preferably has a 5 or 6 membered ring and includes cyclopentyl and cyclohexyl and lower-alkylated derivatives thereof.

The compounds of the invention are prepared by one of the following methods:

(1) The acid HOOC—$CR^3R^4R^5$ or HOOC—Z is heated with 2-tropanol, or a homolog or analog thereof:

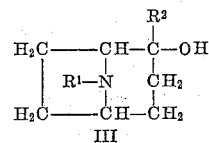

III in the presence of a mineral acid such as sulfuric acid, as a catalyst, said acid being present in an amount greater than that necessary to neutralize the amino alcohol. The reaction can be driven to completion by removing the water formed in the reaction. The acid-addition salt of the basic ester is formed, and the free basic ester can be obtained by addition of a base to the reaction mixture.

(2) An acid halide (preferably chloride or bromide) of the acid HOOC—$CR^3R^4R^5$ or HOOC—Z is treated with 2-tropanol, or a homolog or analog thereof (III), giving a hydrohalide of a basic ester of Formulas I or II. If this process is used, $R^3$ is preferably limited to hydrogen or lower-alkoxy since a free hydroxy group would interfere with acid halide formation.

(3) A lower-alkyl ester of the acid

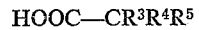

HOOC—$CR^3R^4R^5$ or HOOC—Z is heated with 2-tropanol, or a homolog or analog thereof (III), in the presence of a strong acid or strong base. This is an alcoholysis or ester interchange reaction wherein the more volatile alcohol is eliminated, thus shifting the equilibrium in the direction of the desired ester I or II. The lower-alkyl group of the lower-alkyl ester preferably has from one to about four carbon atoms, thus including such groups as methyl, ethyl, propyl, isopropyl and butyl. The reaction may be carried out in an inert solvent and occurs readily at temperatures between about 50° C. and 200° C.

The 2-tropanols (III); $R^1$ is $CH_3$, $R^2$ is H) of both stereochemical configurations, 2α-tropanol and 2β-tropanol, are known substances, and esters of both isomers are contemplated by the invention.

Compounds of Formula III where $R^1$ is hydrogen, lower-alkyl other than methyl, or lower-alkenyl are prepared from the known 2-tropanols as follows: an ester of 2-tropanol is treated with cyanogen bromide in an inert solvent at about 50° C. During this process the N-methyl group is removed and replaced by a cyano group to give an 8-cyano-2-tropanyl ester. The latter, upon refluxing with concentrated hydrochloric acid is hydrolyzed and decarboxylated to give 2-nortropanol ($R^1$ is H). The 2-nortropanol can then be alkylated with any desired lower-alkyl or lower-alkenyl group by heating it with a lower-alkyl halide or a lower-alkenyl halide in the presence of an acid acceptor such as sodium carbonate.

Compounds of Formula III where $R^2$ is lower-alkyl can be prepared by treating the known 2-tropanone with a lower-alkyllithium. If desired, the resulting 2-lower-alkyl-2-tropanol can be further altered to change the nature of the group $R^1$ as described above.

The compounds of this invention are the free bases of the Formulas I and II and the acid-addition and quaternary ammonium salt forms thereof. The acid-addition salts are prepared by causing the free base to react with a strong inorganic or organic acid, usually in an inert solvent or reaction medium. Examples of appropriate acids include hydrochloric, hydrobromic, sulfuric, phosphoric, citric, tartaric, quinic, benzenesulfonic acid, and the like.

The quaternary ammonium salts of the compounds of the invention are prepared by causing a free base to react with an ester of a strong inorganic or organic sulfonic acid, said ester preferably having a molecular weight less than about 200. A particularly preferred class of esters, because of their ready availability, are lower-alkyl, lower-alkenyl and monocarbocyclic aryl-lower-alkyl esters, for example, methyl iodide, ethyl iodide, ethyl bromide, propyl bromide, butyl bromide, allyl bromide, methyl sulfate, methyl benzenesulfonate, methyl p-toluenesulfonate, benzyl chloride, o-chlorobenzyl chloride, and the like. The reaction of the free base and the quaternizing agent takes place upon simple admixture of the components, preferably in the presence of an inert organic solvent, although heating may be applied to accelerate the reaction.

The acid-addition and quaternary ammonium salts preferably have anions which are pharmacologically acceptable, that is, the anions do not appreciably increase the toxicity of the compound as a whole toward animal organisms. Such anions include, for example, the chloride, bromide, iodide, sulfate or acid sulfate, methanesulfonate, benzenesulfonate, and the like. Salts having toxic anions are, however, useful in that they serve as characterizing derivatives of the free base and serve as intermediates for non-toxic quaternary salts by conventional ion exchange reactions. All acid-addition salts, regardless of the nature of the anions, are useful as intermediates in the purification of the free bases.

Pharmacological evaluation of the compounds of Formulas I and II has demonstrated that they possess pharmacodynamic activity. In particular they possess anticholinergic activity and have the ability to reverse the decrease in spontaneous activity in mice brought about by tremorine (1,4-dipyrrolidino-2-butyne).

The structure of the compounds was established by the methods of preparation and by the fact that the results of chemical analysis were in agreement with the expected structures.

The following examples will further illustrate the invention without the latter being limited thereby.

EXAMPLE 1

*2α-Tropanyl Benzilate* [I; $R^1$ is $CH_3$, $R^2$ is H, $R^3$ is OH (α-configuration), $R^4$ and $R^5$ are $C_6H_5$]

A mixture of 3.00 g. (0.0213 mole) of 2α-tropanol, 5.41 g. (0.0223 mole) of methyl benzilate and 250 ml. of heptane was refluxed for one hour under a Dean-Stark separator. There was then added 0.115 g. (0.00213 mole) of sodium methoxide, and the mixture was refluxed for twenty hours and allowed to stand at room temperature for five days. The reaction mixture was diluted with an equal volume of ether and extracted with a solution of 3 ml. of concentrated hydrochloric acid in 50 ml. of water. The aqueous layer was separated and cooled to 5° C., and the resulting precipitate was collected by filtration to give 5.3 g. of 2α-tropanyl benzilate in the form of its hydrochloride salt, colorless needles, M.P. 228.2–230.6° C. (dec.) (corr.) when recrystallized from water.

An aqueous solution of the hydrochloride salt was converted to the free base by adding excess sodium hydroxide solution. The product was extracted with methylene dichloride, and the extracts were dried over anhydrous sodium sulfate and concentrated to dryness. The residue was dissolved in benzene and chromatographed on a column of magnesium silicate. The product was eluted with benzene and recrystallized from hexane to give 2α-tropanyl benzilate, colorless prisms, M.P. 113.2–114.0° C. (corr.). In another preparation a sample of 2α-tropanyl benzilate was obtained having the M.P. 127–133° C. (uncorr.), the difference in melting point probably being due to polymorphism.

2α-tropanyl benzilate in the form of its hydrochloride salt, when tested for mydriasis in the mouse, by the method described by Long et al., J. Pharmacol. Exptl. Therap. 117, 29 (1956), had an $ED_{50}$ value of 0.044 mg./kg. in terms of the free base; and when measured for its ability to reverse the decrease in spontaneous motility in mice produced by 10 mg./kg. of tremorine, the compound was found to have a normalizing dose (ND) of 0.025 mg./kg. The intravenous toxicity of 2α-tropanyl benzilate hydrochloride in the mouse was determined and an $LD_{50}$ value of 29±2.9 mg./kg. was found.

A solution of 0.30 g. of 2α-tropanyl benzilate in 50 ml. of absolute ethanol was cooled to 0° C. and methyl bromide gas was passed through the solution for thirty minutes. The mixture was allowed to stand at room temperature for four days and then concentrated to dryness. The residue was crystallized first from acetone and then from isopropyl alcohol to give 2α-tropanyl benzilate in the form of its methobromide salt, M.P. 224.7–225.40 C. (dec.) (corr.).

2α-tropanyl benzilate in the form of its methobromide salt was found to have a mydriatic $ED_{50}$ value of 0.019 mg./kg.

In similar fashion 2α-tropanyl benzilate can be treated with ethyl iodide, allyl bromide, methyl sulfate, benzyl chloride, or o-chlorobenzyl chloride to give, respectively, the ethiodide, allobromide, methosulfate, benzochloride, or o-chlorobenzochloride salts of 2α-tropanyl benzilate.

EXAMPLE 2

2β-tropanyl benzilate [I; $R^1$ is $CH_3$, $R^2$ is H, $R^3$ is OH (β-configuration), $R^4$ and $R^5$ are $C_6H_5$] was prepared from 2β-tropanol and methyl benzilate in the presence of sodium methoxide according to the procedure described above in Example 1. The product in the form of the free base was dissolved in ether and treated with an excess of an ether solution of p-toluenesulfonic acid monohydrate. After standing for three days at 0° C. the solid product was collected by filtration and recrystallized from an ethanol-ether mixture to give 2β-tropanyl benzilate in the form of its p-toluenesulfonate salt, M.P. 237–238.40 C. (corr.).

2β-tropanyl benzilate in the form of its p-toluenesulfonate salt was found to have a mydriatic ED$_{50}$ value of 1.34 mg./kg. and a tremorine normalizing dose of 1.5 mg./kg.

2β-tropanyl benzilate can be treated with hydrobromic acid, hydrofluoric acid, hydriodic acid, nitric acid, sulfuric acid, phosphoric acid, acetic acid, citric acid, tartaric acid, lactic acid, quinic acid, naphthalene-1-sulfonic acid, or ethanesulfonic acid to give, respectively, the hydrobromide, hydrofluoride, hydriodide, nitrate, sulfate (or bisulfate), phosphate (or acid phosphate), acetate, citrate (or acid citrate), tartrate (or bitartrate), lactate, quinate, naphthalene-1-sulfonate, or ethanesulfonate salt of 2β-tropanyl benzilate.

The hydrofluoride salt of 2β-tropanyl benzilate can be converted to the hydrochloride salt of 2β-tropanyl benzilate by contacting it with an ion exchange resin saturated with chloride ion.

EXAMPLE 3

2α-tropanyl diphenylmethoxyacetate [I; R$^1$ is C$_3$, R$^2$ is H, R$^3$ is OCH$_3$, R$^4$ and R$^5$ are C$_6$H$_5$] was prepared from 2α-tropanol and methyl diphenylmethoxyacetate in the presence of sodium methoxide according to the procedure described above in Example 1. The compound was obtained in the form of its p-toluenesulfonate salt, colorless prisms, M.P. 126.6–127.7° C. (corr.) when recrystallized from acetone.

2α-tropanyl diphenylmethoxyacetate in the form of its p-toluenesulfonate salt was found to have a mydriatic ED$_{50}$ value of 2.95 mg./kg. and a tremorine normalizing dose of 4.1 mg./kg.

EXAMPLE 4

2α-tropanyl cyclopentyl(2-thienyl)glycolate [I; R$^1$ is CH$_3$, R$^2$ is H, R$^3$ is OH, R$^4$ is C$_5$H$_9$, R$^5$ is 2-C$_4$H$_3$S] was prepared from 2α-tropanol and methyl cyclopentyl(2-thienyl)glycolate in the presence of sodium methoxide according to the procedure described above in Example 1. The compound was obtained in the form of its p-toluenesulfonate salt, M.P. 134.8–136.4° C. (corr.) when recrystallized from an acetone-ether mixture.

The intermediate methyl cyclopentyl(2-thienyl)glycolate was prepared by esterifying the free acid with methanol in the presence of sulfuric acid. The methyl ester had the B.P. 130–134° C. (0.08 mm.), $n_D^{25}$=1.5633.

EXAMPLE 5

2α-tropanyl diphenyl(n-propoxy)acetate [I; R$^1$ is CH$_3$, R$^2$ is H, R$^3$ is OCH$_2$CH$_2$CH$_3$, R$^4$ and R$^5$ are C$_6$H$_5$] was prepared from 2α-tropanol and methyl diphenyl(n-propoxy)acetate in the presence of sodium methoxide according to the procedure described above in Example 1. The compound was obtained in the form of its p-toluenesulfonate salt, M.P. 163.6–165.8° C. (corr.) when recrystallized from ethyl acetate.

The intermediate methyl diphenyl(n-propoxy)acetate was prepared as follows: bromodiphenylacetyl bromide was caused to react with n-propyl alcohol to give n-propyl diphenyl(n-propoxy)acetate, B.P. 139–144° C. (0.4–0.5 mm.) $n_D^{25}$=1.5309. The latter was hydrolyzed by heating with potassium hydroxide in n-propyl alcohol to give diphenyl(n-propoxy)acetic acid, M.P. 109–113° C. The free acid was esterified with diazomethane to give the methyl ester, B.P. 111° C. (0.025 mm.), $n_D^{25.5}$=1.5427.

EXAMPLE 6

2α-tropanyl-di-(2-thienyl) glycolate [I; R$^1$ is CH$_3$, R$^2$ is H, R$^3$ is OH, R$^4$ and R$^5$ are 2-C$_4$H$_3$S] was prepared from 2α-tropanol and methyl di-(2-thienyl)glycolate (M.P. 94–95° C., from the free acid and diazomethane) in the presence of sodium methoxide according to the procedure described above in Example 1. The compound was obtained in the form of its hydrochloride salt, M.P. 199.2–202.0° C. (dec.) (corr.) when recrystallized from ethyl alcohol.

EXAMPLE 7

2α-tropanyl phenyl(2-thienyl)glycolate [I, R$^1$ is CH$_3$, R$^2$ is H, R$^3$ is OH, R$^4$ is C$_6$H$_5$, R$^5$ is 2-C$_4$H$_3$S] was prepared from 2α-tropanol and methyl phenyl(2-thienyl)glycolate [B.P. 147–147.5° C. (0.08 mm.), $n_D^{25}$=1.5855] in the presence of sodium methoxide according to the procedure described above in Example 1. The compound was isolated first in the form of the hydrochloride salt, M.P. 184–188° C. (dec.) (uncorr.) when recrystallized from isopropyl alcohol, and then was converted to the free base, M.P. 131.0–141.0° C. (corr.) when recrystallized from acetone.

2α-tropanyl phenyl(2-thienyl)glycolate in the form of its hydrochloride salt was found to have a mydriatic ED$_{50}$ value of 19.9 micrograms/kg. and a tremorine normalizing dose of 13.5 micrograms/kg.

EXAMPLE 8

2α-*Tropanyl 1-Phenylcyclopentanecarboxylate* [II; R$^1$ is CH$_3$, R$^2$ is H, Z is 1-phenylcyclopentyl]

A solution of 1.41 g. (0.01 mole) of 2α-tropanol and 4.36 g. (0.02 mole) of ethyl 1-phenylcyclopentanecarboxylate in 100 ml. of xylene was refluxed for one hour under a water separator. Sodium (0.02 g., 0.001 mole) was added and the mixture was refluxed for about fifteen hours. Most of the xylene was then distilled off over a period of about two hours until the internal temperature was about 190° C. The reaction mixture was cooled, diluted with ether and extracted several times with dilute hydrochloric acid (3 ml. of concentrated hydrochloric acid in 20 ml. of water). The aqueous phase was extracted with ether and made basic with 10% sodium hydroxide solution. The free base was extracted with ether, and the ether extracts were dried and concentrated to dryness. The residue was dissolved in ethanol, excess hydrochloric acid was added and the solution cooled to —10° C., whereupon there separated 2.65 g. of 2α-tropanyl 1-phenylcyclopentanecarboxylate in the form of its hydrochloride salt, light tan needles, M.P. 186.8–192.0° C. (corr.) when recrystallized first from acetone and then from a methanol-ether mixture.

According to the procedures described hereinabove 2α-tropanol can be caused to react with methyl dicyclohexylacetate, methyl cyclohexylphenylacetate, methyl (2-cyclohexenyl)phenylacetate, methyl 9-fluorenecarboxylate, methyl di-(4-methoxy)benzilate, methyl 9-xanthenecarboxylate, methyl 10-thiaxanthenecarboxylate, methyl 9-(9,10)-dihydroanthracenecarboxylate, methyl 1-(o-tolyl)cyclopentanecarboxylate, methyl 1-(m-methoxyphenyl)cyclopentanecarboxylate, methyl 1-phenylcyclohexanecarboxylate, methyl 1-phenyl-2-methylcyclohexanecarboxylate, methyl (2-cyclopentenyl) (2-cyclohexenyl)acetate, or methyl phenyl(2-pyridyl)acetate, to give, respectively, 2α-tropanyl dicyclohexylacetate [I; R$^1$ is CH$_3$, R$^2$ and R$^3$ are H, R$^4$ and R$^5$ are C$_6$H$_{11}$], 2α-tropanyl cyclohexylphenylacetate [I; R$^1$ is CH$_3$, R$^2$ and R$^3$ are H, R$^4$ is C$_6$H$_5$, R$^5$ is C$_6$H$_{11}$], 2α-tropanyl (2-cyclohexenyl)phenylacetate [I; R$^1$ is CH$_3$, R$^2$ and R$^3$ are H, R$^4$ is C$_6$H$_5$, R$^5$ is 2-cyclohexenyl], 2α-tropanyl 9-fluorenecarboxylate [I; R$^1$ is CH$_3$, R$^2$ and R$^3$ are H, CR$^4$R$^5$ is 9-fluorenyl], 2α-tropanyl di-(4-methoxy)benzilate [I; R$^1$ is CH$_3$, R$^2$ is H, R$^3$ is OH, R$^4$ and R$^5$ are 4-CH$_3$OC$_6$H$_4$], 2α-tropanyl 9-xanthenecarboxylate [I; R$^1$ is CH$_3$, R$^2$ and R$^3$ are H, CR$^4$R$^5$ is 9-xanthenyl], 2α-tropanyl 10-thiaxanthenecarboxylate [I; R$^1$ is CH$_3$, R$^2$ and R$^3$ are H, CR$^4$R$^5$ is 10-thiaxanthenyl], 2α-tropanyl 9-(9,10)-dihydroanthracenecarboxylate [I; R$^1$ is CH$_3$, R$^2$ and R$^3$ are H, CR$^4$R$^5$ is 9-(9,10)-dihydroanthracenyl], 2α-tropanyl 1-(o-tolyl)cyclopentanecarboxylate [II; R$^1$ is CH$_3$, R$^2$ is H, Z is 1-(o-tolyl)cyclopentyl], 2α-tropanyl 1-(m-methoxyphenyl)cyclopentanecarboxylate [II; R$^1$ is CH$_3$, R$^2$ is H, Z is 1-(m-methoxyphenyl)cyclopentyl], 2α-tropanyl 1-phenylcyclohexanecarboxylate [II;

$R^1$ is $CH_3$, $R^2$ is H, Z is 1-phenylcyclohexyl], 2α-tropanyl 1-phenyl-2-methylcyclohexanecarboxylate [II; $R^1$ is $CH_3$, $R^2$ is H, Z is 1-phenyl-2-methylcyclohexyl], 2α-tropanyl (2-cyclopentenyl)(2-cyclohexenyl)acetate [I; $R^1$ is $CH_3$, $R^2$ and $R^3$ are H, $R^4$ is 2-cyclopentenyl, $R^5$ is 2-cyclohexenyl], or 2α-tropanyl phenyl(2-pyridyl)acetate [I; $R^1$ is $CH_3$, $R^2$ and $R^3$ are H, $R^4$ is $C_6H_5$, $R^5$ is $C_5H_4N$].

The methyl esters used as starting materials are prepared by treating the known free acids with an ethereal solution of diazomethane.

EXAMPLE 9

2α-Tropanyl Acetoxydiphenylacetate [I; $R^1$ is $CH_3$ $R^2$ is H, $R^3$ is $CH_3COO$, $R^4$ and $R^5$ are $C_6H_5$]

2α-tropanyl benzilate hydrochloride (Example 1) (2.0 g.) was suspended in methylene dichloride and dilute ammonium hydroxide solution was added until the acid-addition salt had been completely converted to the free base. The aqueous and organic layers were separated, the aqueous layer was extracted with methylene dichloride, and the combined methylene dichloride solutions were dried over magnesium sulfate and concentrated to dryness. The residue was refluxed with 20 ml. of acetic anhydride for ten minutes, and the mixture concentrated on a steam bath in vacuo. The residue was treated with hydrochloric acid (1 part of concentrated hydrochloric acid and 3 parts of water), and the mixture extracted with ether. The aqueous layer was separated, made basic with ammonium hydroxide and extracted with methylene dichloride. The extracts were washed with water, dried over magnesium sulfate and concentrated to dryness. The residue was dissolved in ether and an excess of ethereal hydrogen chloride added. The product which separated was collected and recrystallized from isopropyl alcohol to give 2α-tropanyl acetoxydiphenylacetate in the form of its hydrochloride salt, M.P. 191.2–194.0° C. (dec) (corr.).

By replacing the acetic anhydride in the foregoing preparation by propionic anhydride, butyric anhydride or caproic anhydride there can be obtained, respectively, 2α-tropanyl propionoxydiphenylacetate [I; $R^1$ is $CH_3$, $R^2$ is H, $R^3$ is $CH_3CH_2COO$, $R^4$ and $R^5$ are $C_6H_5$], 2α-tropanyl butyryloxydiphenylacetate [I; $R^1$ is $CH_3$, $R^2$ is H, $R^3$ is $CH_3CH_2CH_2COO$, $R^4$ and $R^5$ are $C_6H_5$], or 2α-tropanyl caproyloxydiphenylacetate [I; $R^1$ is $CH_3$, $R^2$ is H, $R^3$ is $CH_3(CH_2)_4COO$, $R^4$ and $R^5$ are $C_6H_5$].

EXAMPLE 10

2α-Tropanyl Diphenylacetate [I; $R^1$ is $CH_3$, $R^2$ and $R^3$ are H, $R^4$ and $R^5$ are $C_6H_5$]

Diphenylacetic acid (2.96 g.) and 50 ml. of thionyl chloride were refluxed for one hour. The excess thionyl chloride was removed in vacuo, and the residue was dissolved in 10 ml. of methylene dichloride and added to a solution of 1.00 g. of 2α-tropanol in 25 ml. of pyridine. The mixture was allowed to stand at room temperature for about fifteen hours and then heated for thirty minutes on a steam bath while allowing the methylene dichloride to escape. The reaction mixture was concentrated to dryness on a steam bath, and the residue was shaken with ether and 50 ml. of water containing 4 ml. of concentrated hydrochloric acid. The aqueous phase was extracted twice with ether and made basic with sodium hydroxide. The basic product was extracted with methylene dichloride and the extracts were dried and concentrated. The residue was made free of pyridine by heating it at 100° C. (0.08 mm.) for thirty minutes and was distilled at 150–170° C. (0.1 mm.). The distillate was dissolved in an ethanol-ether mixture, and an excess of a solution of hydrogen bromide in acetic acid was added. The crystalline product which separated was collected and recrystallized from an ethanol-ether mixture to give 2α-tropanyl diphenylacetate in the form of its hydrobromide salt, M.P. 209.8–211.8° C. (corr.).

EXAMPLE 11

(a) 2-Methyl-2-Tropanol [III; $R^1$ and $R^2$ are $CH_3$]

To a stirred mixture of 5.5 g. (0.79 mole) of lithium wire in 200 ml. of ether was added 40 drops of a solution of 51 g. of methyl iodide in 200 ml. of ether. The mixture was warmed to initiate reaction and then cooled in ice. The remainder of the ether solution of methyl iodide was added over a period of twenty minutes and the mixture was refluxed for thirty minutes. The resulting mixture was cooled in an ice bath and 10 g. (0.072 mole) of 2-tropanone in 50 ml. of ether was added over a period of twenty minutes. The reaction mixture was refluxed for thirty minutes, allowed to stand at room temperature for about fifteen hours and then hydrolyzed by careful addition of water. The aqueous layers were separated, saturated with potassium carbonate and extracted with methylene dichloride. The methylene dichloride extracts were combined with the original ether layer, dried over magnesium sulfate and concentrated to dryness. The residue was recrystallized from hexane to give 5.8 g. of 2-methyl-2-tropanol, M.P. 93–94° C. (uncorr.). The infrared spectrum indicates the presence of a free hydroxy group and that the compound is the equatorial alcohol, 2β-methyl-2α-tropanol. A portion of the free base was converted to its p-toluenesulfonate salt, M.P. 133–135° C. (uncorr.) when recrystallized from an ethyl acetate-acetone mixture.

(b) 2β-methyl-2α-tropanyl benzilate [I; $R^1$ and $R^2$ are $CH_3$, $R^3$ is OH, $R^4$ and $R^5$ are $C_6H_5$] can be prepared from 2β-methyl-2α-tropanol and methyl benzilate according to the procedure described above in Example 1.

Similarly, 2β-methyl-2α-tropanol reacts with methyl 1-phenylcyclopentanecarboxylate to give 2β-methyl-2α-tropanyl 1-phenylcyclopentanecarboxylate [II; $R^1$ and $R^2$ are $CH_3$, Z is 1-phenylcyclopentyl].

By analogous procedures, 2-tropanone can be caused to react with butyllithium to give 2β-butyl-2α-tropanol, and the latter esterified with methyl benzilate to give 2β-butyl-2α-tropanyl benzilate [I; $R^1$ is $CH_3$, $R^2$ is $C_4H_9$, $R^3$ is OH, $R^4$ and $^5$ are $C_6H_5$].

EXAMPLE 12

(a) 2α-tropanyl acetate gradually added to a benzene solution of a molar excess of cyanogen bromide in benzene solution at a temperature of about 50° C. and the solution concentrated gives 8-cyano-2α-nortropanyl acetate. 8-cyano-2α-nortropanyl acetate when refluxed with concentrated hydrochloric acid for several hours, the mixture made basic with potassium carbonate, and the product isolated, gives 2α-hydroxynortropane [III; $R^1$ and $R^2$ are H].

By a similar procedure 2β-methyl-2α-tropanol (Example 11a) in the form of its acetate ester is converted to 2β-methyl-2α-hydroxynortropane [III; $R^1$ is H, $R^2$ is $CH_3$].

A mixture of 2α-hydroxynortropane and a molar excess of allyl bromide in n-butyl alcohol in the presence of sodium carbonate refluxed for about fifteen hours, and the product isolated, gives 8-allyl-2α-hydroxynortropane [III; $R^1$ is $CH_2=CHCH_2$, $R^2$ is H].

Similarly, 2α-hydroxynortropane reacts with isopropyl bromide or n-butyl bromide to give 8-isopropyl-2α-hydroxynortropane [III; $R^1$ is $(CH_3)_2CH$, $R^2$ is H] or 8-(n-butyl)-2α-hydoxynortropane [III; $R^1$ is $CH_3CH_2CH_2CH_2$, $R^2$ is H]; and 2β-methyl-2α-hydroxynortropane reacts with allyl bromide to give 8-allyl-2β-methyl-2α-hydroxynortropane [III; $R^1$ is $CH_2=CHCH_2$, $R^2$ is $CH_3$].

(b) According to the procedure described in Example 1, methyl benzilate can be caused to react with 2α-hydroxynortropane, 2β - methyl - 2α - hydroxynortropane, 8 - allyl - 2α - hydroxynortropane, 8 - isopropyl - 2α-hydroxynortropane, 8 - (n - butyl) - 2α - hydroxynortropane, or 8-allyl-2β-methyl-2α-hydroxynortropane, to give, respectively, 2α-nortropanyl benzilate [I; $R^1$ and $R^2$ are H, $R^3$ is OH, $R^4$ and $R^5$ are $C_6H_5$], 2β-methyl-2α-nortropanyl benzilate [I; $R^1$ is H, $R^2$ is $CH_3$, $R^3$ is OH, $R^4$ and $R^5$ are $C_6H_5$], 8-allyl-2α-nortropanyl benzilate [I; $R^1$ is $CH_2=CHCH_2$, $R^2$ is H, $R^3$ is OH, $R^4$ and $R^5$ are $C_6H_5$], 8-isopropyl-2α-nortropanyl benzilate [I; $R^1$ is $(CH_3)_2CH$, $R^2$ is H, $R^3$ is OH, $R^4$ and $R^5$ are $C_6H_5$], 8-(n-butyl)-2α-nortropanyl benzilate [I; $R^1$ is $CH_3CH_2CH_2CH_2$, $R^2$ is H, $R^3$ is OH, $R^4$ and $R^5$ are $C_6H_5$], or 8-allyl-2β-methyl-2α-nortropanyl benzilate [I; $R^1$ is $CH_2=CHCH_2$, $R^2$ is $CH_3$, $R^3$ is OH, $R^4$ and $R^5$ are $C_6H_5$].

Similarly, 2α-hydroxynortropane and 8-allyl-2α-hydroxynortropane each reacts with methyl 1-phenylcyclopentanecarboxylate to give, respectively, 2α-nortropanyl 1-phenylcyclopentanecarboxylate [II; $R^1$ and $R^2$ are H, Z is 1-phenylcyclopentyl] and 8-allyl-2α-nortropanyl 1-phenylcyclopentanecarboxylate [II; $R^1$ is $CH_2=CHCH_2$, $R^2$ is H, Z is 1-phenylcyclopentyl].

We claim:
1. A compound selected from the group consisting of (A) compounds of the formula

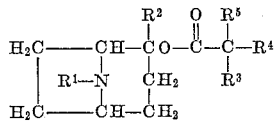

wherein $R^1$ is a member of the group consisting of hydrogen, lower-alkyl and lower-alkenyl; $R^2$ is a member of the group consisting of hydrogen and lower-alkyl; $R^3$ is a member of the group consisting of hydrogen, hydroxy, lower-alkoxy and lower-alkanoyloxy; and $R^4$ and $R^5$ are members of the group consisting of monocarbocyclic aryl, thienyl, pyridyl, cycloalkyl having from 5 to 6 ring members and cycloalkenyl having from 5 to 6 ring members; (B) compounds of the above formula wherein $R^4$ and $R^5$ in the moiety $CR^4R^5$ are joined to form a member of the group consisting of fluorenyl, xanthenyl, thiaxanthenyl and 9,10-dihydroanthracenyl; (C) acid-addition salts of (A) and (B); and (D) lower-alkyl, lower-alkenyl and monocarbocyclic aryl-lower-alkyl quaternary ammonium salts of (A) and (B); monocarbocyclic aryl in each instance being a member of the group consisting of phenyl and phenyl substituted by from one to three radicals selected from the group consisting of lower-alkyl, lower-alkoxy, halogen, lower-alkylmercapto and trifluoromethyl.

2. A compound of the formula

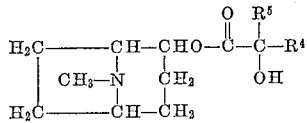

wherein $R^4$ and $R^5$ are phenyl.
3. 2α-tropanyl benzilate.
4. 2α-tropanyl benzilate methobromide.
5. 2β-tropanyl benzilate.
6. 2α-tropanyl diphenylmethoxyacetate.
7. 2α-tropanyl cyclopentyl(2-thienyl)glycolate.
8. 2α-tropanyl diphenylpropoxyacetate.
9. 2α-tropanyl di-(2-thienyl)glycolate.
10. 2α-tropanyl phenyl(2-thienyl)glycolate.
11. 2α-tropanyl acetoxydiphenylacetate.
12. 2α-tropanyl diphenylacetate.
13. A compound selected from the group consisting of (A) compounds of the formula

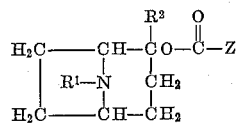

wherein $R^1$ is a member of the group consisting of hydrogen, lower-alkyl and lower-alkenyl; $R^2$ is a member of the group consisting of hydrogen and lower-alkyl; and Z is 1-(monocarbocyclic aryl)cycloalkyl wherein the cycloalkyl has from 5 to 6 ring members; (B) acid-addition salts thereof; and (C) lower-alkyl, lower-alkenyl and monocarbocyclic aryl-lower-alkyl quaternary ammonium salts thereof; monocarbocyclic aryl in each instance being a member of the group consisting of phenyl and phenyl substituted by from one to three radicals selected from the group consisting of lower-alkyl, lower-alkoxy, halogen, lower-alkylmercapto and trifluoromethyl.

14. 2α-tropanyl 1-phenylcyclopentanecarboxylate.

References Cited in the file of this patent

UNITED STATES PATENTS

| | | |
|---|---|---|
| 2,748,133 | Karrer | May 29, 1956 |
| 2,800,476 | Stoll et al. | July 23, 1957 |
| 2,921,938 | Wetterau | Jan. 19, 1960 |

OTHER REFERENCES

Ayer et al.: J. Am. Chem. Soc., Vol. 80, p. 6146 (1958).

Bell et al.: J. Am. Chem. Soc., Vol. 80, p. 6147 (1958).

UNITED STATES PATENT OFFICE
CERTIFICATE OF CORRECTION

Patent No. 3,145,210                                                          August 18, 1964

Sydney Archer et al.

It is hereby certified that error appears in the above numbered patent requiring correction and that the said Letters Patent should read as corrected below.

Column 1, lines 44 and 45, for "hydrogen or lower-alkyl" read -- hydrogen, lower-alkyl or lower-alkenyl --; line 46, strike out "groups preferably"; column 5, line 22, for "$R^1$ is $C_3$" read -- $R^1$ is $CH_3$ --.

Signed and sealed this 30th day of March 1965.

(SEAL)
Attest:

ERNEST W. SWIDER                                        EDWARD J. BRENNER
Attesting Officer                                            Commissioner of Patents